J. M. HARTNETT.
Corn Husker.
No. 81,631.  Patented Sept. 1, 1868.
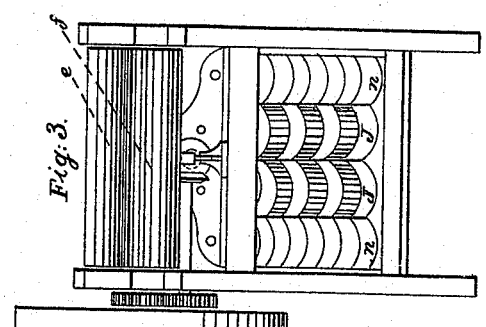
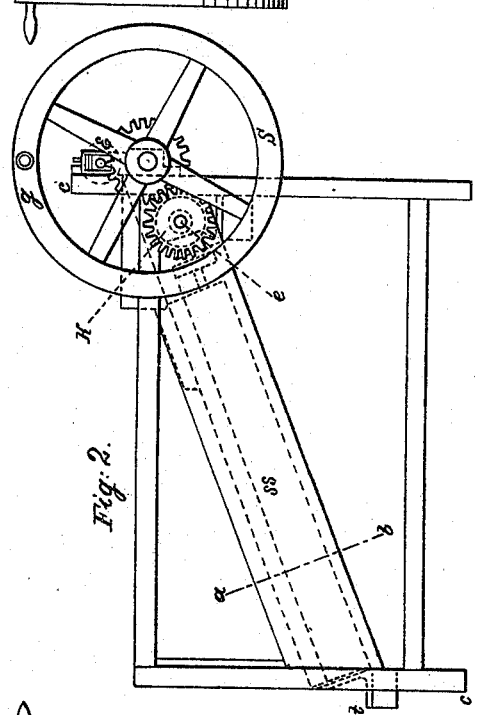
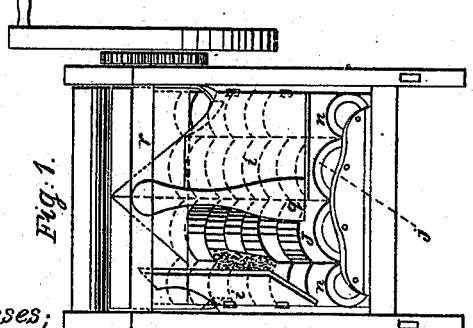
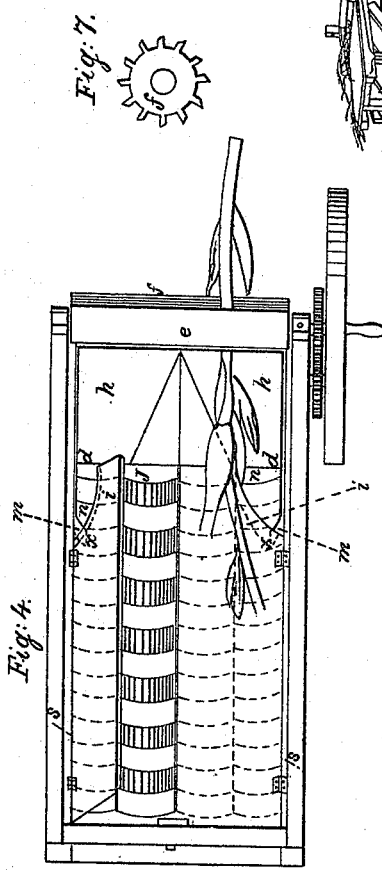
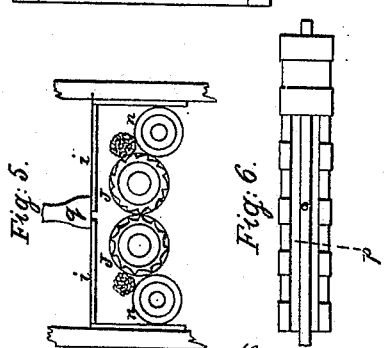
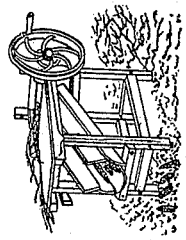
Witnesses;
Geo. S. Wheeler
Wm Edmonds
John M. Hartnett
Inventor,
By Frank Keller
Attorney

UNITED STATES PATENT OFFICE.

JOHN M. HARTNETT, OF WAUKEGAN, ASSIGNOR TO ROBERT L. FABIAN, OF LAKE FOREST, ILLINOIS.

IMPROVEMENT IN CORN-HUSKERS.

Specification forming part of Letters Patent No. 81,631, dated September 1, 1868.

*To all whom it may concern:*

Be it known that I, JOHN M. HARTNETT, of Waukegan, in the county of Lake and State of Illinois, have invented a new and useful Machine for Husking Corn; and I do hereby declare that the following is a full, clear, and exact description of the construction and operation of the same, reference being had to the annexed drawings, in which—

Figures I and III represent both the end views of the machine; Fig. II, a side view; Fig. IV, the ground plan. Fig. V shows a section through the rollers in the direction of the line *a b* in Fig. II.

The machine consists of an oblong wooden frame on legs, as appears in Fig. II, and marked *c c c c*, covered by a wooden slab as far as the line *d d* in Fig. IV, the remaining space being open to admit the ears of corn to fall into the chutes from the picker, (a device which I apply,) composed of two rolls, the lower corrugated and the upper plain. A section of the upper appears in Fig. II, marked *e*, and the upper and lower in Fig. III, marked, respectively, *e* and *f*, also in Fig. IV, marked as above, where the cornstalk is represented as passing through the rolls and the ear approaching to be picked off. The lower picker-roll is turned by a shaft entering the wheel *g g* in Fig. II.

The ear of corn, being detached from the stalk, drops into the hopper or chute *h h*, as shown in Fig. IV, and is directed to the opening or cut on the side of the hinged door *i i*, which admits it to fall on the rolls *j j n n*, as represented in Figs. I, III, IV, and V. These rolls are set on an incline, as represented in Fig. II, and are longitudinal of the machine. They are revolved by being geared together. The motion from the gear-wheel *k* in Fig. II is imparted to them by the mesh of two bevel-wheels, one attached to the elongated shaft of one of the rolls and the other to the shaft which penetrates wheel *k*, and is marked *l* in Fig. II.

The chute or hopper *h h* is of metal, and there is a continuation or strip of the same material, *m m*, running along the side board, and turned inward at the point where the cut in the hinged door commences, and marked *x* in Fig. IV.

The longitudinal rolls (see Fig. VI) are constructed of an iron shaft, marked *o*, covered with wood, marked *p*, and this again covered with alternate wheels of rubber and metal. The metal sections on the rolls *j j* are formed with teeth or spurs, as represented in Fig. V. Those on the rolls *n n* are smooth. The rolls are placed so that the metal rings are opposite, and the rubber rings opposite each to each. The rolls are of two sizes, the center one, *j j*, being larger than *n n* by one-third or one-half of its diameter, as shown in Fig. V.

The pendant *q* in Figs. I and V holds down the doors *i i* when the machine is in operation. It is suspended from the cross-piece *r* in Fig. I, and may be moved from side to side, so as to permit the raising of the doors *i i*.

I use two side pieces of wood, as marked *s s* in Fig. II, to which the doors are hinged, and to which I attach a strip or slat running parallel with the ouside roll, and about two and one-half inches above it, the entire length of the board *s s*. On this the corn or ear rests or strikes when leaving the hopper and before dropping on the rollers, after which the strip serves for a fender to keep the ear in its longitudinal position on the rolls.

The machine is used by feeding the cornstalk (with the ear on) butt-end to diagonal rollers. The ear dropping down, when it reaches them, is directed, by the form of the chute *h h*, Fig. IV, to the opening in the door, which, being beveled underneath, causes it to fall longitudinally on the rolls. These, revolving toward each other, grasp the husk and silk, depositing them underneath the machine, and delivering the cleaned ear at the end marked *t* in Fig. II.

The use and object of the hopper or chutes *h h*, as designed, are to give proper direction to the ear after it leaves the picker, and may be made to direct it to the center rolls of the machine, which would be desirable in a large implement.

The use and object of the strip under the opening in the doors are to hold the point of the ear, so that the whole ear may become fairly at right angles with the diagonal rollers or picker, and roll evenly over, presenting its side, and not its point, to the longitudinal rollers. The rollers then seize the husk at the sides, and not on the end, thereby avoiding the drawing in of the point of the ear, and consequent stopping or breaking of the machinery, which ensues on the presentation to the rolls of that point of the ear.

The doors $i\,i$, when fastened by the pendant $q$, are designed to prevent the ear from upending, and, while placed sufficiently far from the rolls to allow the corn to rotate, they keep it constantly presented laterally to the rolls $j\,j$ and $n\,n$, for their action on the husk and silk.

The design in constructing the rolls of alternate rings of rubber and metal is, first, that the rubber may perform the husking; and, secondly, that, in the event of ears presenting the point or butt, the knives or spurs on the rolls $j\,j$, operating against the smooth rolls $n\,n$, cut off the point presented, and the door $i\,i$, being held rigidly by the pendant $q$, causes the ear to resume its proper relative position to the rolls $j\,j$ and $n\,n$.

The design in making the rolls of varying size in diameter is to insure a more certain and rapid rotation of the ear on its passage over them, and less opportunity or disposition to clog or be drawn in.

The intent of the continued strip of metal $m\,m$ from the chute to the point $x$ in Fig. IV is to present an unbroken side surface to the ear, and also, by the curve or turn inward at point $x$, to give the ear an inclination to fall over on the rolls $j\,j$ and $n\,n$.

I therefore make the following claims, viz:

1. The hopper or chute $h\,h$, with the metal extension $m\,m$, as and for the purposes herein specified.

2. The hinged door $i\,i$, with the pendant or fastening $q$, as and for the purposes herein specified.

3. The rolls $j\,j$ and $n\,n$, varying in size, working together, the combination of iron and wood, and the covering with alternate rings of metal and rubber, and of spurred and plain metal, as herein fully specified, and for the purposes set forth.

JOHN M. HARTNETT.

Witnesses:
GEO. S. WHEELER,
WM. EDMONDS.